United States Patent [19]
Jureit

[11] 3,828,514
[45] Aug. 13, 1974

[54] STRUCTURAL JOINT AND CONNECTOR PLATE THEREFOR

[75] Inventor: John Calvin Jureit, Coral Gables, Fla.

[73] Assignee: Automated Building Components, Inc., Miami, Fla.

[22] Filed: Oct. 8, 1971

[21] Appl. No.: 187,744

[52] U.S. Cl.................. 52/753 D, 52/753 L, 85/11
[51] Int. Cl............................................. F16b 7/00
[58] Field of Search.........287/20.92 L, 20.92 D, 287/20.92 C, 20.94, 20.95; 85/11, 13; 52/712, 715, 721, 735, 241, 243, 345, 238, 262, 51, 48, 46, 289, 753 D, 753 L

[56] References Cited
UNITED STATES PATENTS

| | | | |
|---|---|---|---|
| 2,256,394 | 9/1941 | Lamel.............................. 52/243 X |
| 2,321,221 | 6/1943 | Linehan.......................... 287/20.94 |
| 2,700,457 | 1/1955 | Munroe....................... 287/20.95 X |
| 2,973,175 | 2/1961 | Appleton........................ 85/11 UX |
| 3,286,416 | 11/1966 | Ashworth........................ 52/735 X |
| 3,417,652 | 12/1968 | Menge..................... 287/20.92 L X |
| 3,454,292 | 7/1969 | Sanford.................... 287/20.92 L X |
| 3,498,171 | 3/1970 | Jureit................................... 85/13 |
| 3,633,950 | 1/1972 | Gilb............................... 287/20.94 |

FOREIGN PATENTS OR APPLICATIONS

| 683,104 | 3/1964 | Canada..................... 287/20.92 L |
| 1,192,458 | 5/1965 | Germany................. 287/189.36 D |

Primary Examiner—James R. Boler
Assistant Examiner—Wayne L. Shedd
Attorney, Agent, or Firm—LeBlanc & Shur

[57] ABSTRACT

The connector plate comprises a right angle bracket having in one flange a plurality of teeth struck to provide angularly related shank and end portions. The shank portions project in a direction away from the struck flange. The tip portions project toward the struck flange for insertion through the corresponding slot into a wooden member. The other flange is connected to a metal member, for example, by a weld or rivet. In a third form, a plurality of teeth are struck to project from the other flange in a direction away from the first flange for insertion in openings formed in the metal member. The tips of the teeth remote from the bracket are deformed to effect connection between the bracket and metal member.

6 Claims, 8 Drawing Figures

PATENTED AUG 13 1974 3,828,514
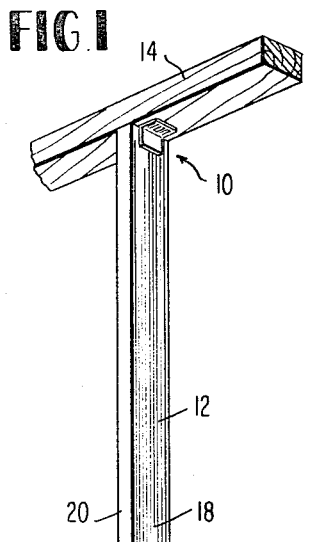
FIG. 1
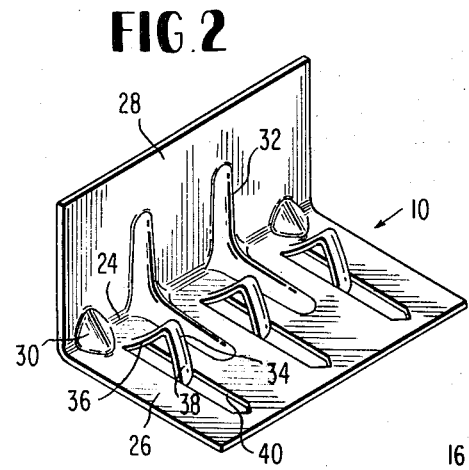
FIG. 2
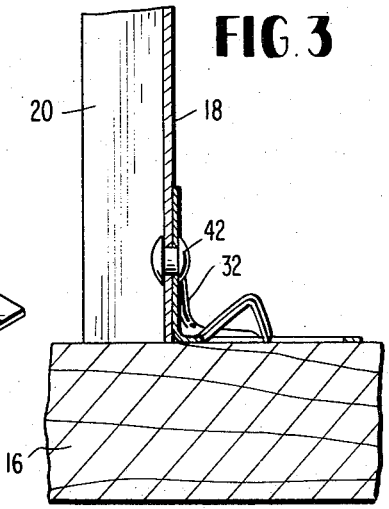
FIG. 3
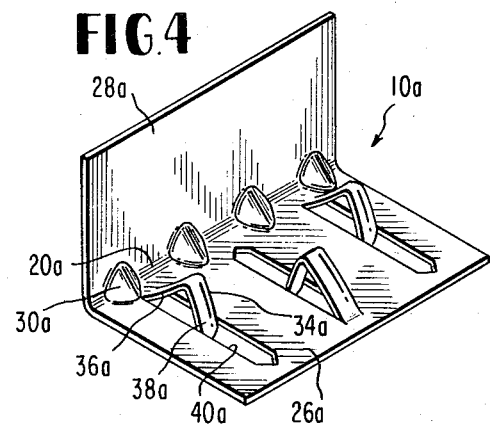
FIG. 4
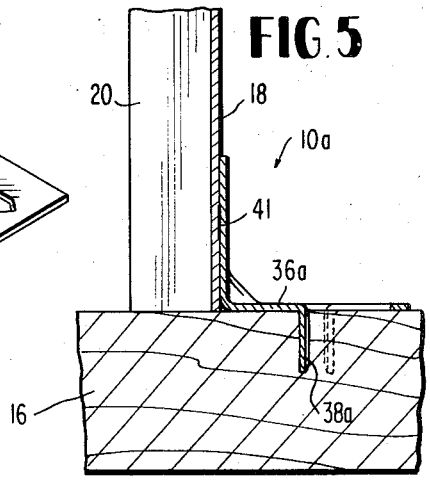
FIG. 5
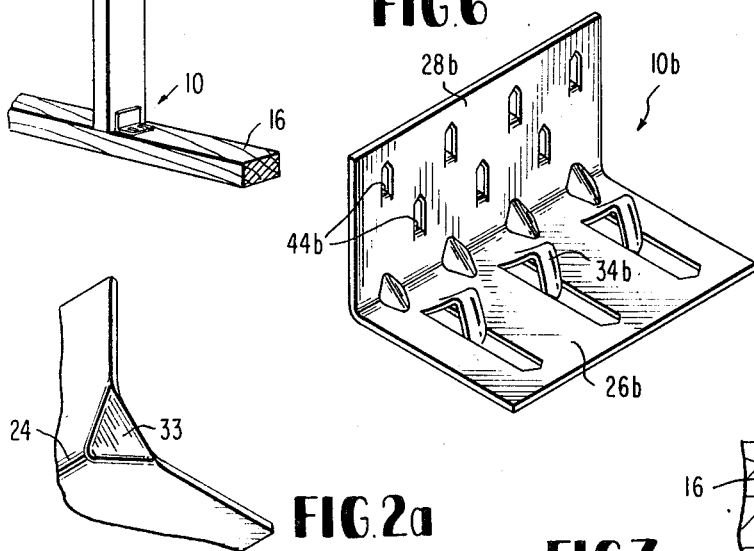
FIG. 6
FIG. 2a
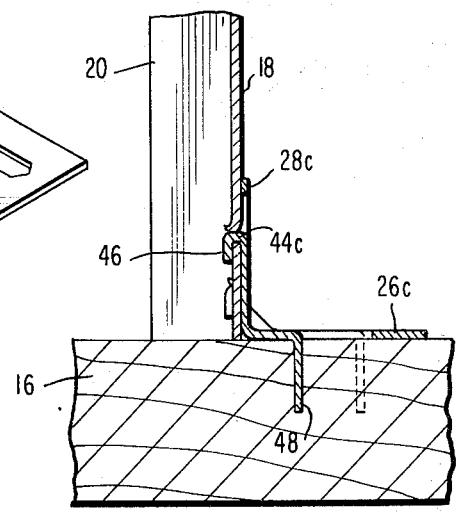
FIG. 7

STRUCTURAL JOINT AND CONNECTOR PLATE THEREFOR

The present invention relates to structural joints and connector plates therefor and particularly relates to a joint and connector plate therefor wherein one of the members of the joint comprises a metal stud and the other member comprises a wooden rail.

There is presently a tendency to utilize metal channel-shaped members in lieu of standard wooden studs for wooden frames, panels, and the like. Problems have been encountered in effectively joining the upper and lower ends of the metal studs to the wooden horizontally extending upper and lower plates.

The present invention provides a connector plate or bracket suitable for this purpose. Particularly, the present invention provides a bracket comprised of a sheet metal member bent about an axis to define first and second flanges normally disposed one to the other. The bracket is formed such that a plurality of gussets are provided along the fold line between the flanges to reinforce the bracket. One of the flanges is provided with a plurality of teeth struck to leave a plurality of elongated slots therein. In one form hereof, the teeth project from the first flanges on the side thereof adjacent the second flange and include angularly related shank and tip portions. Particularly, the shank portion projects away from the first flange while the tip portion extends toward the first flange in position poised for insertion through the slot and into the wooden member.

To form the joint hereof, a bracket is connected to the metal stud at its opposite ends. Particularly, the second flange of each bracket may be conventionally welded or riveted to the metal stud. When the metal stud and brackets are located in a building frame, the stud is disposed at right angles to the upper and lower plates and the second flanges directly overlie the respective plates. The tip portions of the teeth struck from the first flange are then driven through the slots from which they were struck and into the wooden plates. A suitable manually actuated hammer or press may be provided for this purpose. The tip portions are thus fully embedded in the wooden members, thereby securing the brackets and metal stud to the plates.

In a further form hereof, the first flange of the bracket is provided with the angled teeth previously described or with a plurality of slender elongated nail-like teeth struck to extend from the bracket on the side thereof remote from the second flange. The second flange is also provided with a plurality of teeth struck to project from the second flange on the side of the bracket remote from the first flange. The metal member may be provided with a plurality of openings spaced one from the other similarly as the teeth of the second flange are spaced one from the other. To secure the bracket to the metal member, the teeth are received within the openings and the tips thereof deformed, for example by peening. Alternatively, the teeth may be driven through the metal member directly without the necessity of first forming openings in the metal member. These connections between the bracket and metal member are particularly effective where it is desired to first join the brackets to the wooden members. The teeth struck from the first flange may be fully embedded into the wooden member, thereby locating the second flange in a position normally disposed to the wooden member. The metal member can then be disposed adjacent the second flange with the teeth thereof received through preformed openings and peened over to effect final securement between the wooden plate and metal stud.

Accordingly, it is a primary object of the present invention to provide a novel and improved joint and connector plate or bracket therefor, particularly useful in joining a metal member and a wooden member.

It is another object of the present invention to provide a novel and improved joint and connector plate or bracket therefor particularly adapted for joining metal channel-shaped studs and wooden plates for the formation of building frames, panels and the like.

It is still another object of the present invention to provide a novel and improved joint and connector plate or bracket therefor for joining a metal member and a wooden member and which bracket is economical to fabricate, easy to use, and readily applied to the metal and wooden members.

These and further objects and advantages of the present invention will become more apparent upon reference to the following specification, claims, and appended drawings, wherein:

FIG. 1 is a fragmentary perspective view of a portion of a building frame illustrating a pair of joints and connector plates or brackets therefor constructed in accordance with the present invention;

FIG. 2 is a fragmentary perspective view of a connector plate or bracket constructed in accordance with the present invention;

FIG. 2a is a fragmentary perspective view of a corner of the plate illustrating a form of reinforcement for the plate flanges;

FIG. 3 is a fragmentary side elevational view of the lower joint illustrated in FIG. 1;

FIG. 4 is a view similar to FIG. 2 illustrating a further form of bracket hereof;

FIG. 5 is a view similar to FIG. 3 illustrating the bracket illustrated in FIG. 4 in a joint;

FIG. 6 is a perspective view of a still further form of bracket hereof; and

FIG. 7 is a fragmentary side elevational view of a joint utilizing a still further form of bracket hereof.

Referring now to the drawings, particularly to FIG. 1, there is illustrated a pair of connector plates or brackets, generally indicated 10, for joining the upper and lower ends of a metal stud 12 to upper and lower plates 14 and 16, respectively, the metal stud 12 and plates 14 and 16 forming a frame, panel and the like. The metal stud 12 is preferably in the form of a channel member having a base 18 and a pair of side flanges 20. (Stud 12 could also have a Z or T or L shape, if desired.) The upper and lower plates 14 and 16, respectively, may comprise members forming a standard frame and the like for use, for example, in building construction. As will be developed in the ensuing description, the brackets 10 may be utilized to join the metal member to the wooden member or, conversely, to join the wooden member to the metal member, depending upon the type of plate herein utilized and the desired manner of fabrication.

Brackets 10 each include a sheet metal plate bent about a fold line or axis indicated at 24 to provide first and second flanges 26 and 28, respectively, extending in generally normal relation one to the other. In bending the plate 10 to form the right-angularly related flanges 26 and 28, it is desirable to reinforce the plate such that the flanges do not become angularly disoriented from their predetermined position. To this end, the plate is provided with a pair of gussets 30 disposed adjacent the opposite ends of the bend axis 24 and a pair of inner elongated gussets 32. Alternatively or conjunctively, the corners of the plate at opposite ends of the fold axis 24 can be flattened to flare outwardly, for example, at an angle of about 45°. This appears as a triangularly shaped element 33.

There is provided a plurality of teeth 34 struck to project from flange 26 on the same side thereof as flange 28. Teeth 34 are struck to provide shank portions 36 and tip portions 38 angularly related to shank portions 36 in such a manner that the tip portions are poised for insertion through the slots 40 left in flange 26 by the struck teeth. The configuration of each of the foregoing described teeth 34 is per se conventional and known in the art. The teeth 34 preferably have a shallow V-shaped cross section throughout their full length for reinforcement purposes. Teeth 34 are struck such that the slots extend from the teeth in a direction away from the flange 28. Flange 28, in this form of bracket, has a smooth continuous surface for butting engagement against the base 18 of the metal member.

To apply brackets 10 to the metal member and wooden member, each bracket may first be secured to the metal member 12, for example by one or more rivets 42 as illustrated in FIG. 3, or as illustrated in FIG. 5, and in a different form of bracket hereof, by a spot weld. When brackets 10 have been applied adjacent the opposite ends of the metal members 12, the stud is disposed between the wooden framing plates 14 and 16. When so disposed, the tip portions 38 of teeth 34 are poised for insertion through slots 40 for embedment into the wooden plates. Tip portions 38 may be driven into wooden members 14 and 16 by a suitable manually operated impact gun. Upon driving the tip portions 38 into the wooden members, the stud 12 is fully secured to and between the framing members 14 and 16.

Referring now to the embodiment hereof illustrated in FIGS. 4 and 5, there is provided a plate 10a having generally right-angularly related flanges 26a and 28a and a plurality of small triangular-shaped gussets 30a along the fold line 20a for maintaining the flanges in their predetermined angular orientation. As in the previous embodiment, the flange 28a has a smooth continuous surface. Flange 26a, however, is provided with a plurality of teeth each having a similar configuration as the individual teeth of the previous embodiment. That is, the teeth 34a are struck from flange 26a to project therefrom on the same side thereof as flange 28a projects. Teeth 34a also include shank portions 36a and tip portions 38a poised for insertion through the slots 40a left by the teeth 34a. In this form, however, adjacent teeth across the plate are struck in opposite directions such that the slots extend from the teeth in opposite directions. Preferably, three such teeth are provided in flange 26a with the two end teeth having slots extending from the teeth in a direction away from flange 28a and the middle tooth arranged such that its slot extends toward flange 28a. The teeth are thus staggered across the bracket.

Referring to FIG. 5, bracket 10a may be joined to the metal member similarly as bracket 10 of the previous embodiment, that is, by riveting. However, as illustrated in FIG. 5, a spot weld 41 may also be provided. When the plate is secured to base 18 of stud 12, the stud may be disposed between frame members 14 and 16 and the tip portions 34a of the teeth driven through the corresponding slots for embedment into wooden members 14 and 16.

Referring now to the embodiment hereof illustrated in FIG. 6, there is provided a third form of bracket 10b having a pair of generally right-angularly related flanges 26b and 28b. The flange 26b is provided with a plurality of teeth 34b of the same type and arrangement as the teeth 34 in the embodiment illustrated in FIG. 2. Flange 28b also has a plurality of teeth 44b struck to project in a direction away from flange 26b. Teeth 44b are arranged across the plate in two rows with the teeth in each row being staggered relative to the teeth of the other row. Teeth 44b are different than teeth 34b in that teeth 44b project directly from flange 28b at generally right angles thereto. For example, these teeth may be of the type disclosed in U.S. Pat. No. 2,877,520 of common assignee herewith. In this form, the brackets 10 may be fastened to either the metal stud or wooden framing member or both at the job site.

To utilize bracket 10b, the base 18 of metal stud 12 may be provided at its opposite ends with a plurality of openings spaced one from the other similarly as the teeth 44b of plate 10b are spaced one from the other. Alternatively, if stud 12 is formed of relatively thin gauge metal, the teeth 44b may be driven through the metal base 18 by a suitable tool as previously noted. Preformed openings in the metal would not in this latter siutation be required. Teeth 44b are engaged through the openings in the metal stud 12 and the tip portions thereof on the side of the base 18 remote from flange 28b are deformed, as for example by peening which is illustrated at 46 in the embodiment of bracket illustrated in FIG. 7. Alternatively, the tip portions can be deformed to provide an enlarged head in the form of a rivet on the inside face of base 18. Teeth 34b are then driven into the wooden members 14 or 16 by means of the tool previously described. The bracket could, of course, be secured to the wooden members prior to securement thereof to the metal stud.

In FIG. 7, a further form of bracket 10c is provided. In this form, flange 28c is provided with teeth 44c similarly as the teeth 44b of the embodiment illustrated in FIG. 6. However, the teeth 48 struck from flange 26c in this form may comprise slender elongated nail-like teeth which project from flange 26c in a direction away from flange 28c. For example, the teeth 48 may comprise teeth similar to those disclosed in U.S. Pat. No. 2,877,520. In this form, the teeth 48 are embedded into the wooden framing members at predetermined positions. The metal stud 12 may then be later secured to the bracket.

In a preferred form hereof, for example the bracket illustrated in FIGS. 2–3, the bracket 10 may be formed of suitable U.S. Standard Gauge galvanized steel, for example 18 or 20 gauge. The flanges 26 and 28 extend from fold line 24 distances about 1.9 and 1.5 inches respectively. The teeth 34 have an extended length about 1.35 inches. The bracket is preferably about 3 inches wide such that its edges will lie inset from the opposite edges of a 2 × 4. Teeth 34 are preferably symmetrically arranged and lie in 1 inch centers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A joint comprising an elongated metal member, an elongated wooden member, said members being generally normally disposed one to the other, means for joining said members one to the other including a sheet metal bracket formed about an axis generally normal to a plane passing through said members to define first and second angularly related bracket portions, means carried by said bracket and extending between said first and second bracket portions for reinforcing said bracket, said first bracket portion having a plurality of elongated nail-like teeth extending integrally therefrom leaving a plurality of slots in said first bracket portion, said teeth being embedded into said wooden member to form the sole securement between said bracket and said wooden member, means for connecting said second bracket portion to said metal member to secure said bracket to said metal member.

2. A joint according to claim 1 wherein said connecting means includes a rivet.

3. A joint according to claim 1 wherein said connecting means includes a weld between said metal member and said bracket.

4. A joint according to claim 1 wherein said connecting means includes a plurality of teeth extending from said second bracket portion and engaging through said metal member, the tips of said teeth on the side of said metal member remote from said second bracket portion being deformed to preclude withdrawal of the teeth from the metal member.

5. A joint according to claim 1 for use in a building frame, metal and wooden members comprising a stud and a plate for said frame.

6. A joint according to claim 5 wherein said metal member comprises a channel, one end of said metal channel member butting said wooden plate with the base of the channel member extending transversely of said wooden plate.

* * * * *